(12) United States Patent
Katayama

(10) Patent No.: US 10,532,644 B2
(45) Date of Patent: Jan. 14, 2020

(54) VEHICLE BODY STRUCTURE

(71) Applicant: HONDA MOTOR CO., LTD., Tokyo (JP)

(72) Inventor: Yoichi Katayama, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/830,112

(22) Filed: Dec. 4, 2017

(65) Prior Publication Data

US 2018/0154753 A1 Jun. 7, 2018

(30) Foreign Application Priority Data

Dec. 6, 2016 (JP) .................................. 2016-236305

(51) Int. Cl.
*B60J 10/86* (2016.01)
*B60J 5/04* (2006.01)
*B60J 10/20* (2016.01)

(52) U.S. Cl.
CPC ................. *B60J 10/86* (2016.02); *B60J 5/04* (2013.01); *B60J 10/20* (2016.02)

(58) Field of Classification Search
CPC .... B60J 10/86; B60J 10/20; B60J 5/04; B60R 13/04
USPC ....................................................... 296/146.9
See application file for complete search history.

(56) References Cited

U.S. PATENT DOCUMENTS 7,565,771 B2* 7/2009 Brocke .................... B60J 10/16
49/377
2015/0210219 A1* 7/2015 Watanabe ............... B60R 13/04
280/163

FOREIGN PATENT DOCUMENTS

| JP | H11314530 A | 11/1999 |
| JP | 2002120564 A | 4/2002 |
| JP | 2014-054953 A | 3/2014 |

OTHER PUBLICATIONS

Japanese Office Action application No. 2016-236305 dated May 8, 2018.

\* cited by examiner

*Primary Examiner* — Joseph D. Pape
*Assistant Examiner* — Dana D Ivey
(74) *Attorney, Agent, or Firm* — Squire Patton Boggs (US) LLP

(57) ABSTRACT

A vehicle body structure is provided that has fewer parts and allows a seal member securely sealing a gap between a vehicle body and a door to be attached thereto. The vehicle body structure has a door that covers and uncovers a door opening formed in a vehicle body. The door has a first garnish that is located on an outer side of a vehicle than the door, and a seal member that is attached to the first garnish and seals a gap between the door and the vehicle body. The first garnish has an insertion groove defined by a contact wall extending in a direction which is orthogonal to a lateral direction, and the seal member is inserted in the insertion groove so as to be in contact with the contact wall.

6 Claims, 12 Drawing Sheets

VII—VII

X-X

VEHICLE BODY STRUCTURE

CROSS REFERENCE TO RELATED APPLICATION

This application claims the benefit of priority to Japanese Patent Application No. 2016-236305 filed on Dec. 6, 2016, the disclosures of all of which are hereby incorporated by reference in their entireties.

FIELD OF THE INVENTION

The present invention relates to a vehicle body structure.

DESCRIPTION OF THE RELATED ART

As a related vehicle body structure, a vehicle having a vehicle body structure is known in which a door is arranged at a door opening formed in a vehicle body so as to be opened and closed. A door weather strip is attached around the door, to seal the circumference of the door opening on the vehicle body side and around the door in a state where the door is closed (for example, Japanese Patent Application Publication No. 2014-54953).

The door weather strip is fixed on a door panel inner with clips in a state of being curved so as to run along a curved shape of a wheel arch or the like.

SUMMARY OF THE INVENTION

In the related vehicle body structure, the door weather strip is fixed on the door inner panel with the clips in a direction orthogonal to door opening and closing directions.

For this reason, when the door is opened or closed, a force is applied to the seal member toward a direction of the clips being sheared, and the seal member may be tilted or peeled off.

Further, there is a problem that the manufacturing cost rises with use of the clips.

The present invention is intended to provide a vehicle structure that has fewer parts and allows a seal member securely sealing a gap between a vehicle body and a door to be attached thereto.

The present invention provides a vehicle body structure having: a door that covers and uncovers a door opening formed in a vehicle body, wherein the door has a first garnish that is located on an outer side of a vehicle than the door, and a seal member that is attached to the first garnish and seals a gap between the door and the vehicle body, wherein the first garnish has an insertion groove defined by a contact wall extending in a direction which is orthogonal to a lateral direction, and the seal member is inserted in the insertion groove so as to be in contact with the contact wall.

According to the present invention, a vehicle body structure is provided that has fewer parts and allows a seal member securely sealing a gap between a vehicle body and a door to be attached thereto.

DETAILED DESCRIPTION OF THE PREFERRED EMBODIMENTS

Figure 1:
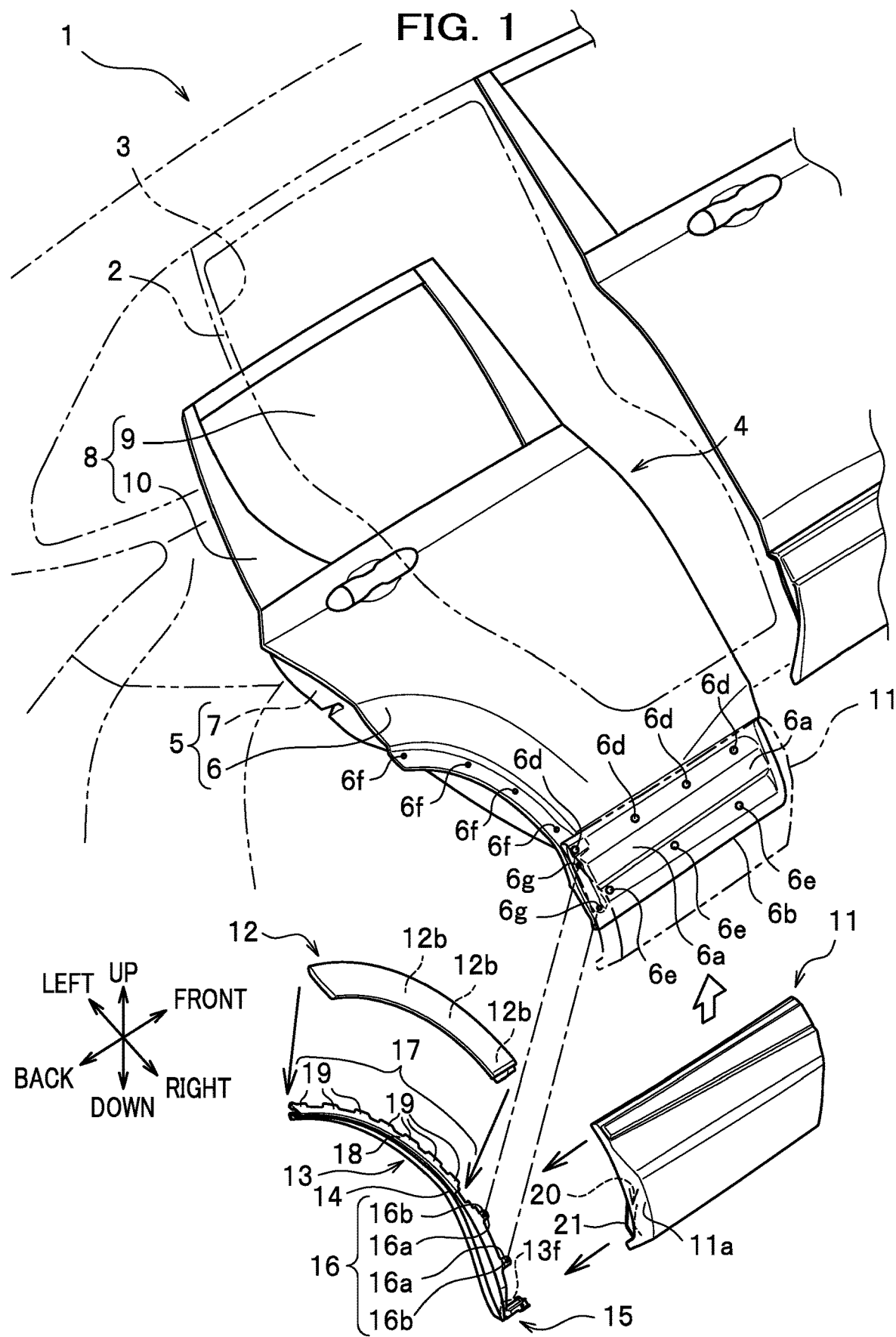
FIG. 1 is an exploded perspective view of a rear door in a vehicle body structure according to an embodiment of the present invention.

Hereinafter, a preferred embodiment of the present invention will be described in detail with reference to the drawings appropriately. The same elements are denoted by the same reference numerals, and redundant descriptions will be omitted. In describing directions, the directions will be described basically based on longitudinal, lateral and vertical directions as viewed from a driver. Further, a "vehicle width direction" means the "lateral direction".

Figure 2:
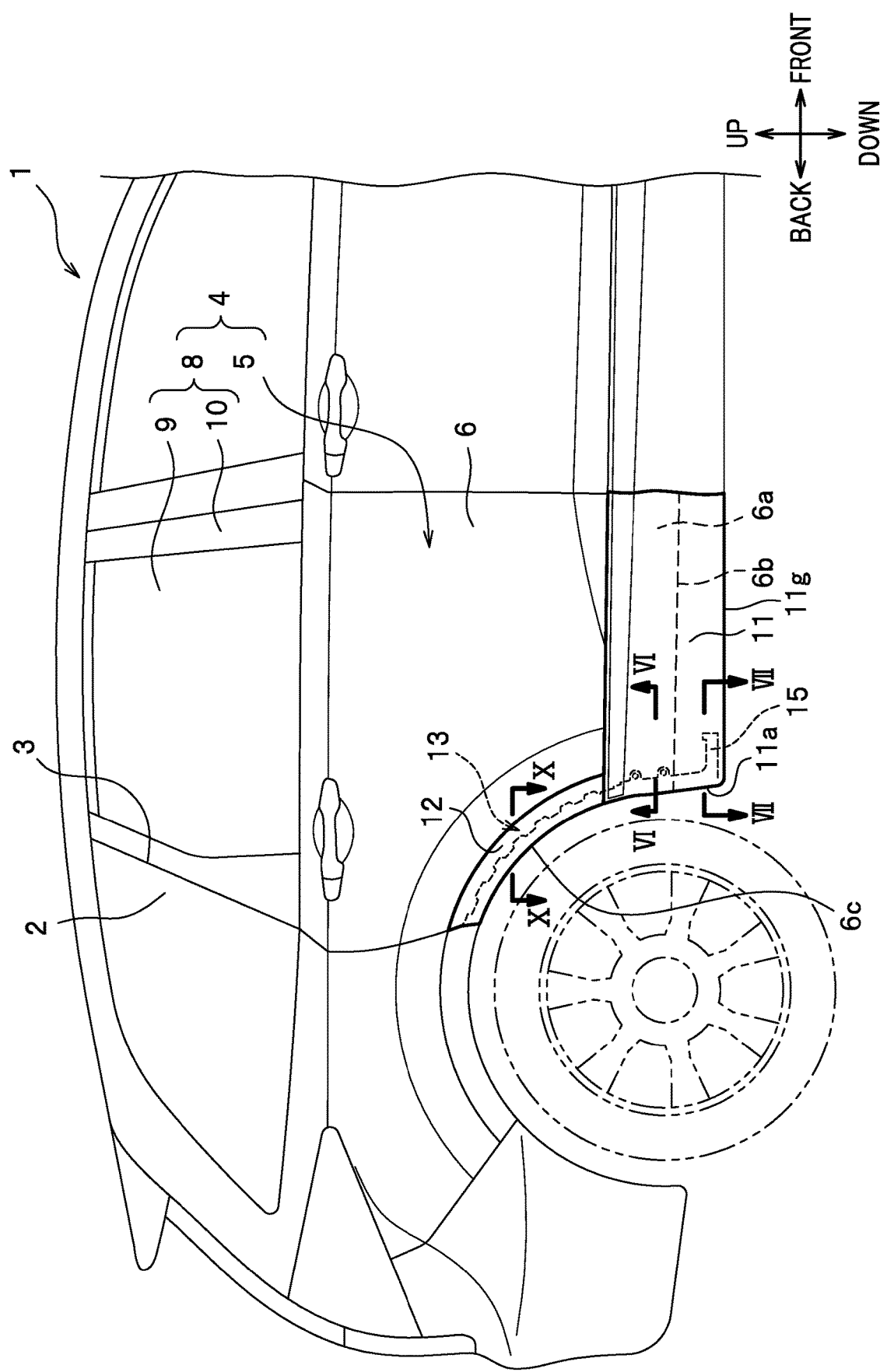
FIG. 2 is a side view of the rear door of the embodiment attached to a vehicle body.

As shown in FIGS. 1 and 2, a vehicle 1 of the embodiment has a door opening 3 in a side face of a vehicle body 2. A rear door (door) 4 to open and close the door opening 3 is provided on the door opening 3.

The rear door 4 includes a door body 5 and a window 8 having a rear window panel 9 and a sash 10. Further, the rear door 4 includes a first garnish 11 and a second garnish 12 positioned outer than the rear door 4. The second garnish 12 is arranged at a position not to be overlapped with the first garnish 11 and to be overlapped with the rear door 4 as viewed in the vehicle width direction.

The rear door 4 further includes a seal member 13 that is attached across a wheel arch 6c of a door outer panel 6 and the first garnish 11 to seal a gap between the rear door 4 and the vehicle body 2.

Among these members, the door body 5 including the door outer panel 6 and a door inner panel 7 is made of a metal material. The door body 5 has external dimensions slightly smaller than the door opening 3. As shown in FIG. 2, the first garnish 11 is attached to an outer face 6a of the door outer panel 6 at a lower portion 6b in a state that the longitudinal orientation of the first garnish 11 is along with the longitudinal direction of the vehicle.

The first garnish 11 is attached to the vehicle body 2 as follows. That is, as shown in FIG. 1, a plurality of mounting holes 6d and 6e are respectively formed on the outer face 6a of the door outer panel 6 along the lower portion 6b.

Figure 3:
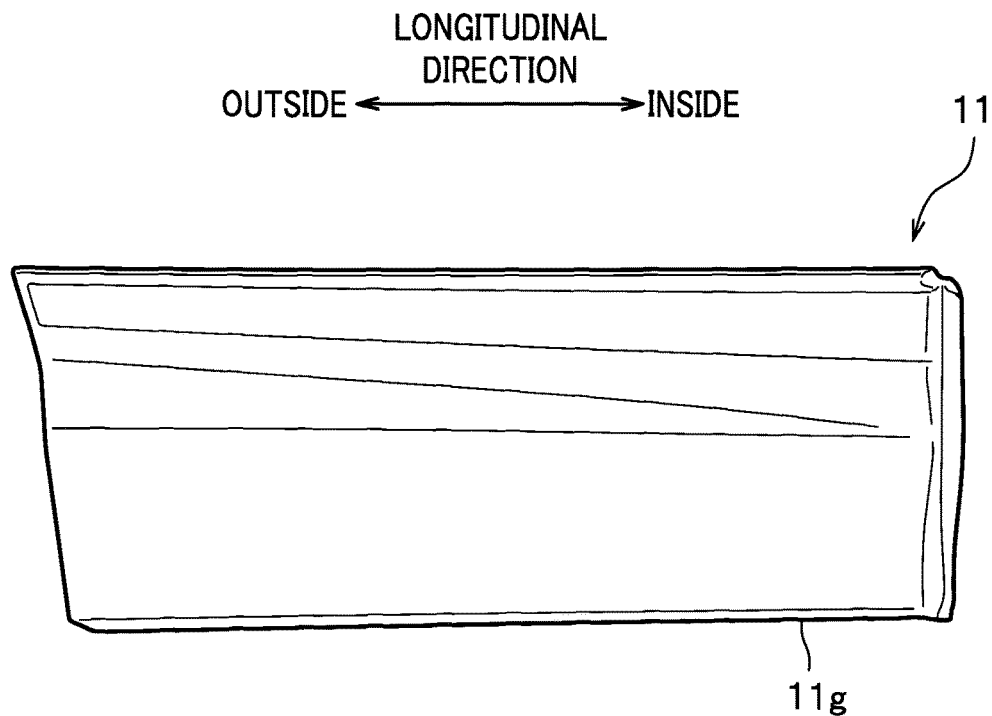
FIG. 3 is a front view of a first garnish attached to the rear door.
Figure 4:
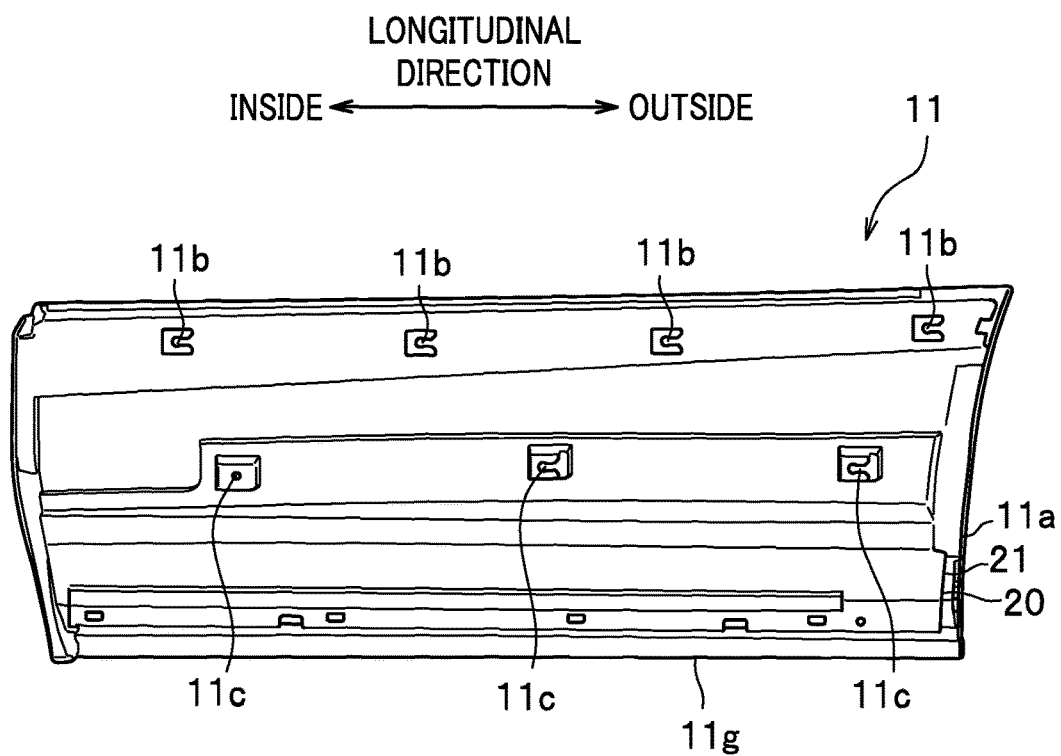
FIG. 4 is a rear view of the first garnish attached to the rear door.

As shown in FIGS. 3 and 4, the first garnish 11 is in a substantially hollow rectangular shape in a front view (the same as viewed from the side of the vehicle), and is made of an elongated plate-shaped synthetic resin material having the longitudinal direction running along the vehicle front-rear direction.

Further, the first garnish 11 has, on its rear face side, a plurality of mounting portions 11b and 11c associated with the mounting holes 6d and 6e.

The mounting portions 11b and 11c are fixed to the mounting holes 6d and 6e respectively, using fixtures such as bolts (not shown).

As shown in FIG. 2, the first garnish 11 of the embodiment is attached to the outer face 6a in a state where the first garnish 11 protrudes downward with an approximately even width from the lower portion 6b to a lower edge 11g at a predetermined vehicle front-rear position in a predetermined length. The lower edge 11g of the first garnish 11 is formed in a substantially L-shaped cross-section in the lateral direction to improve its rigidity (see FIG. 5).

Therefore, in a state where the rear door 4 is closed as shown in FIG. 2, the upper opening portion of the door opening 3 is covered with the metal door body 5 and the lower opening portion of the door opening 3 is covered with the relatively lightweight first garnish 11 made of a synthetic resin. Therefore, the rear door 4 closes almost all of the door opening 3, while preventing an increase in weight according to the enlargement of the area of the door body 5.

Further, an insertion groove 20 is defined at the lower of a rear end portion 11a of the first garnish 11. Then, the seal member 13 is inserted into the insertion groove 20 (see FIG. 1).

The insertion groove 20 is defined by a contact wall 21 and a pressing wall 22, both having a dogleg cross-section as viewed from the back, arranged in parallel to have a slitty gap therebetween.

Figure 6:
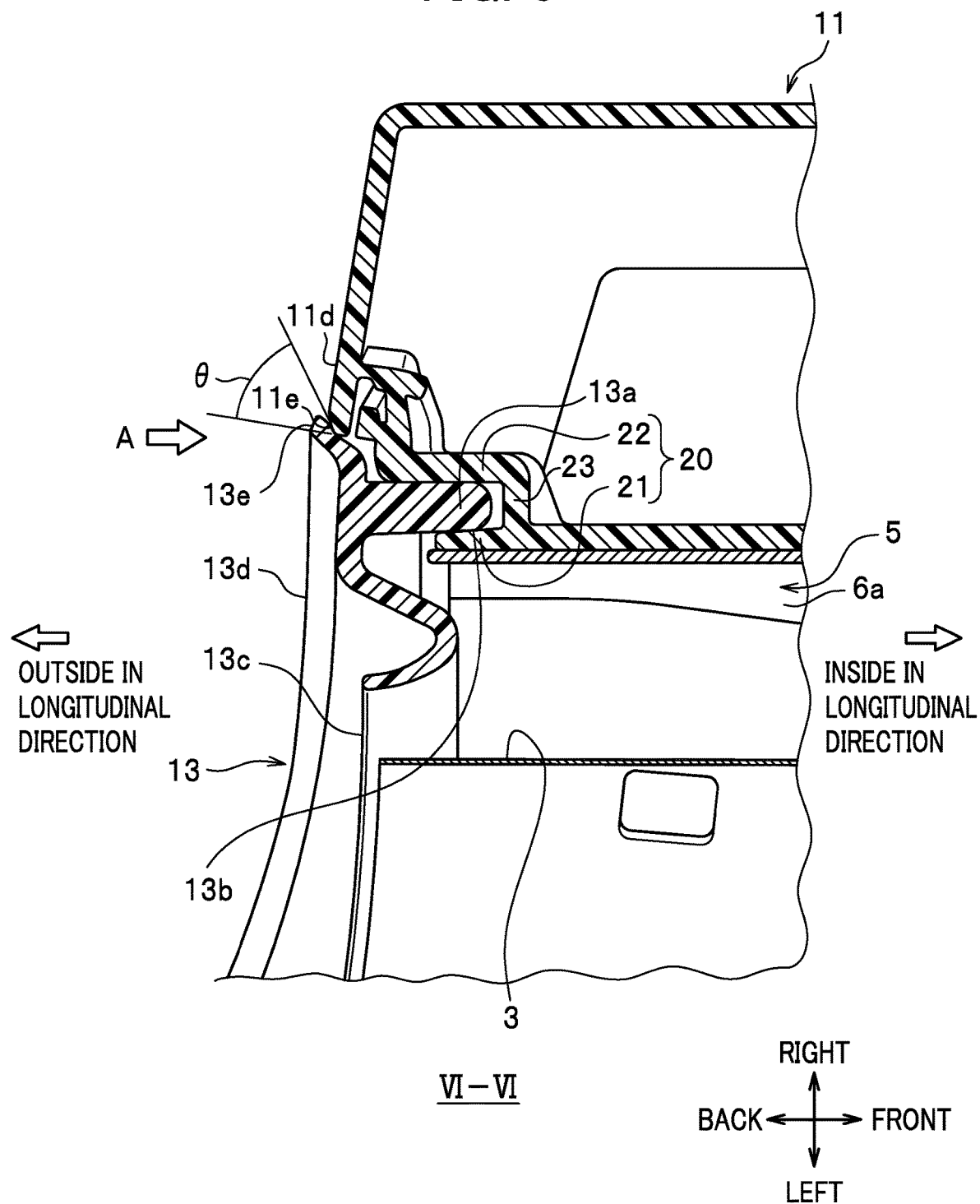
FIG. 6 is a cross-sectional view of a structure of the rear door taken along a VI-VI line in FIG. 2.
Figure 7:
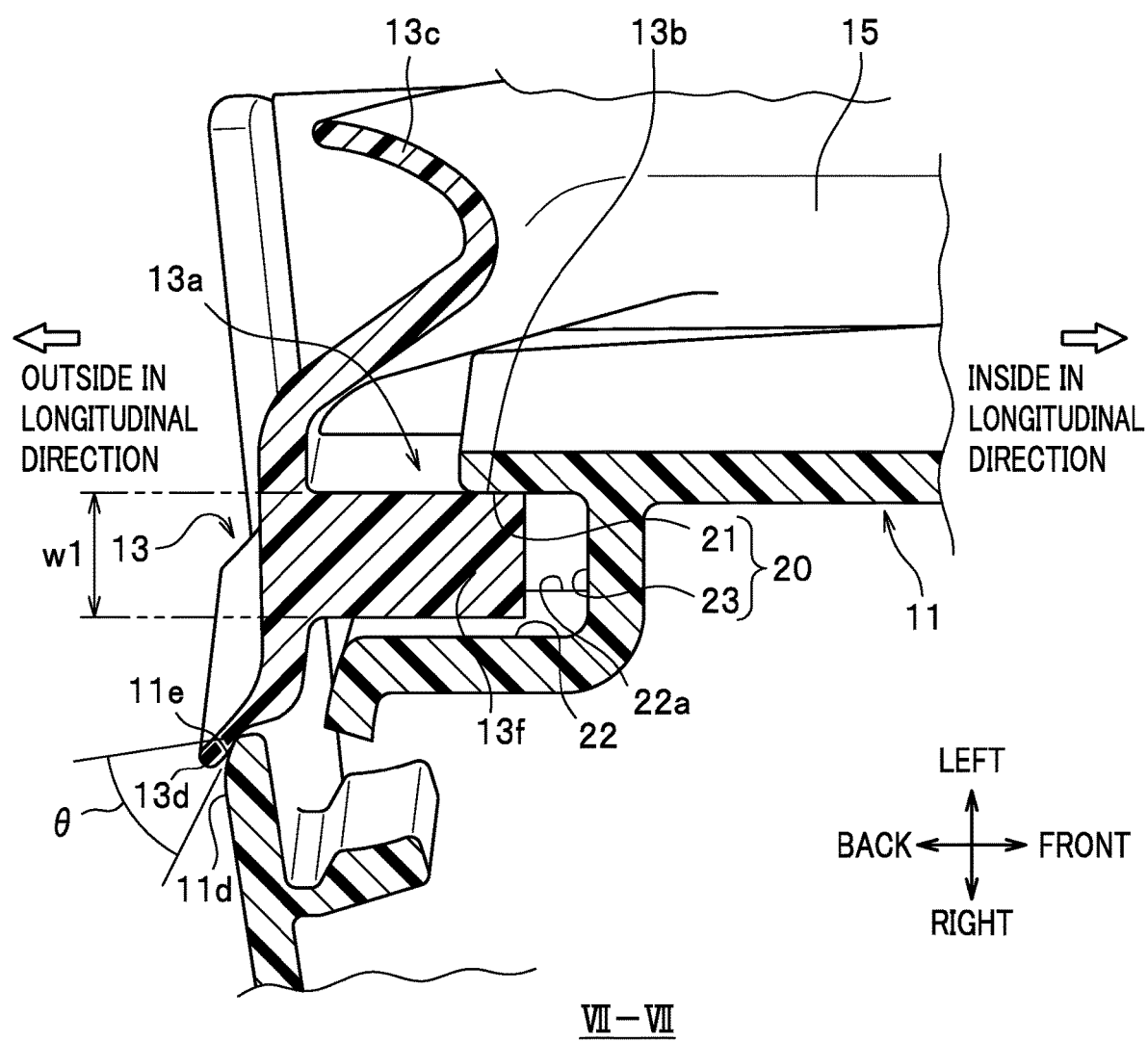
FIG. 7 is a cross-sectional view showing a structure of the rear door taken along a VII-VII line in FIG. 2.

As shown in FIGS. 6 and 7, the contact wall 21 is formed shorter than the pressing wall 22 toward the rear of the vehicle in the longitudinal direction. Further, the pressing wall 22 is formed thicker than the contact wall 21 in the lateral direction. A bottom wall 23 connects the contact wall 21 to the pressing wall 22 at the front side in the longitudinal direction. Accordingly, the insertion groove 20 is formed in an approximately concave shape in the horizontal cross-section of which rear side is open, so as to be inserted with the seal member 13 from the rear of the vehicle.

The seal member 13 inserted in the insertion groove is pressed from the vehicle outer direction toward the vehicle inner direction by the pressing wall 22 to be brought in contact with an inner face of the contact wall 21.

Figure 5:
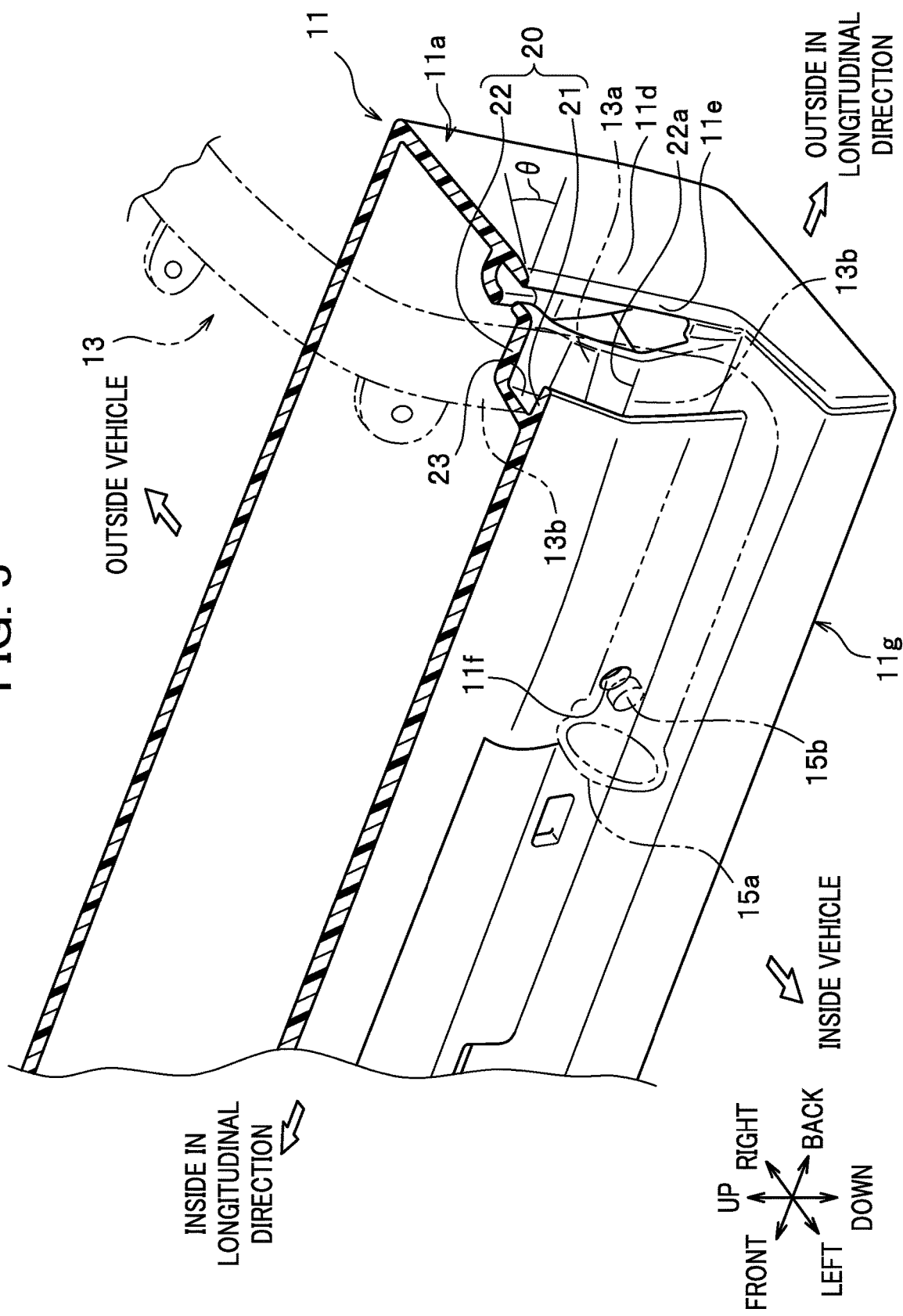
FIG. 5 is a partial cross-sectional perspective view showing an insertion groove that is defined in the first garnish on the rear door.

As shown in FIG. 5, the rear end portion 11a of the first garnish 11 has an inclined portion 11e that faces outside the vehicle and inclines toward outside the vehicle at a given angle θ as extending toward outside in the longitudinal direction.

The inclined portion 11e is formed at a side edge on the vehicle inner side of a rear wall 11d in the the rear end portion 11a.

The inclined portion 11e is configured to be formed to extend along the insertion groove 20 in the vertical direction and to be adjacent in the lateral direction to the seal member 13 inserted in the insertion groove 20.

Figure 8:
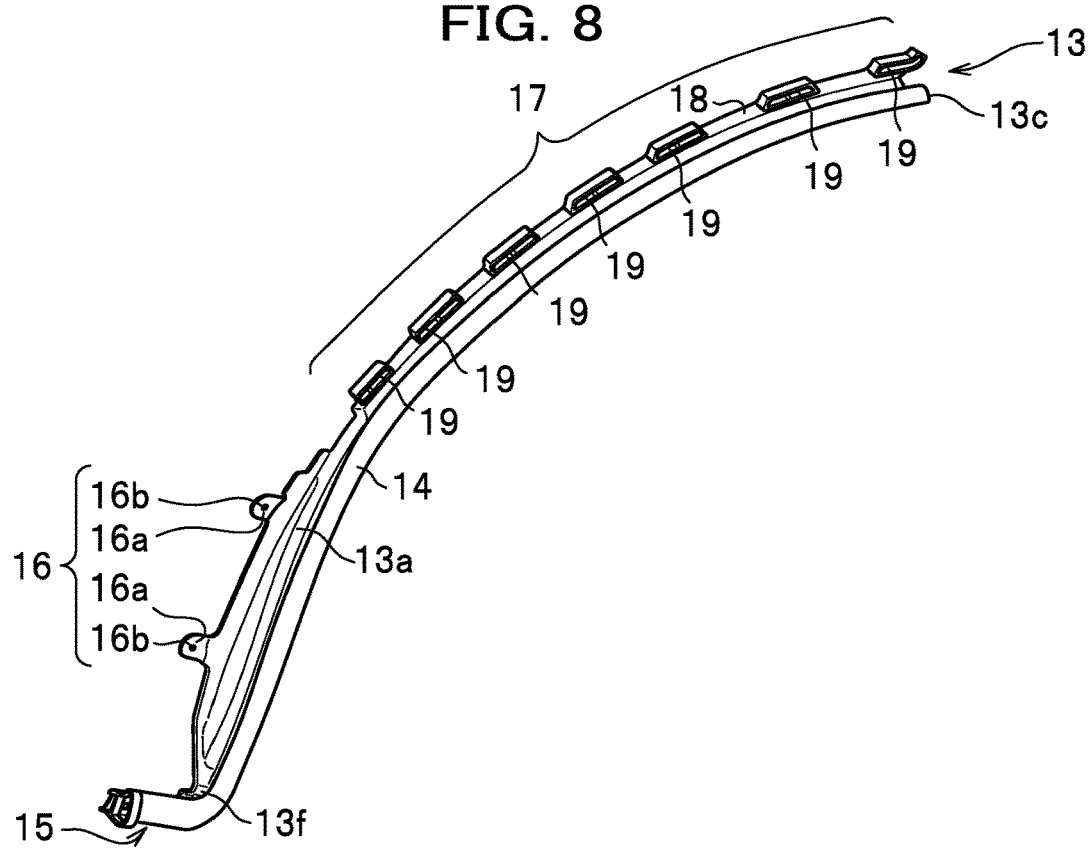
FIG. 8 is one side view of a seal member.
Figure 9:
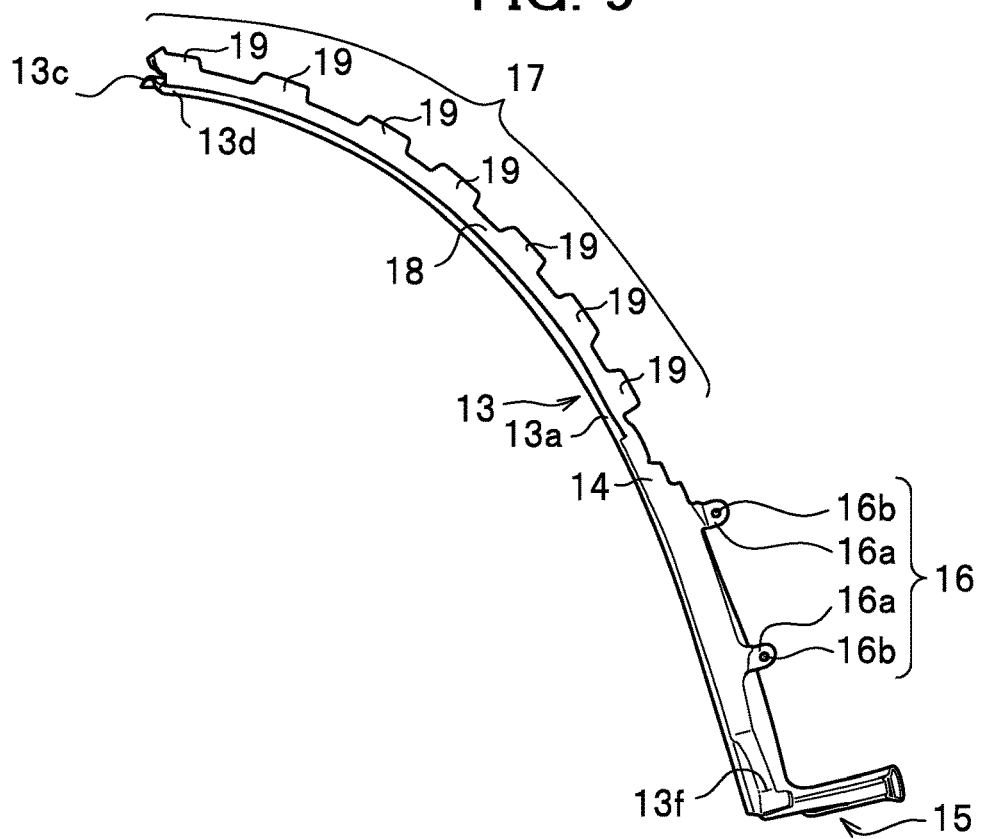
FIG. 9 is the other side view of the seal member.

FIGS. 8 and 9 are perspective views of the seal member 13 as viewed from the right and left, respectively. The seal member 13 has a wheel arch seal portion 14 in an arch shape along a wheel shape and a lower-end seal portion 15 in a linear shape along a lower end shape of the rear door 4 that are die-molded continuously in one piece.

The wheel arch seal portion 14 has an elongated base member 13a that extends substantially all over the seal member 13 and has a substantially rectangular cross-section.

Further, a connection between the wheel arch seal portion 14 and the lower-end seal portion 15 is bent at a substantially right angle. An engaged portion 13f that is engaged with the insertion groove 20 in an inserted state is formed on the connection at a part of the base member 13a. The engaged portion 13f is relatively thicker than other portions of the base member 13a, and is bent continuously in the vertical direction so that an outer side thereof is recessed to have a substantially dogleg in cross-section in the lateral direction.

The engaged portion 13f has a given width W1 in the lateral direction so as to be in contact with the inner faces of the pressing wall 22 and the contact wall 21 at the position where the engaged portion 13f is engaged with the insertion groove 20 (see FIG. 7).

Further, a door seal portion 13c that contacts a peripheral edge of the wheel arch on a side closer to the vehicle body to seal the rear door 4, and a garnish seal portion 13d that seals a gap between itself and the first garnish 11 are arranged in the base member 13a at a side edge on the rear side of the vehicle.

When the rear door 4 is closed, the door seal portion 13c serves to contact the peripheral edge of the door opening 3 on a side closer to the vehicle body 2 so as to keep in water-tight between the rear door 4 and the vehicle body 2.

Still further, the garnish seal portion 13d has a distal edge 13e that overlaps the inclined portion 11e of the rear wall 11d as viewed from outside in the longitudinal direction (direction A) and extends to cover over the inclined portion 11e (see FIG. 6).

As shown in FIGS. 6 and 7, the garnish seal portion 13d, as viewed from the direction A, overlaps the inclined portion 11e of the rear wall 11d by given dimensions such that the distal edge 13e contacts, and covers over, the inclined portion 11e from the direction A.

Accordingly, the distal edge 13e in the present embodiment is positioned longitudinally outward than the inclined portion 11e while being in contact therewith.

As shown in FIGS. 8 and 9, a fixing portion 16 is formed in line with a clamped portion 17 in the vertical direction on a side edge of the base member 13a on the front side of the vehicle that is opposite to a side edge on the rear side of the vehicle.

The fixing portion 16 has protruding pieces 16b, 16b that face the door body 5 to protrude forward. Fixing holes 16a, 16a are formed in the protruding pieces 16b, 16b, respectively.

Seal fixing holes 6g, 6g to be associated with the respective fixed holes 16a, 16a are formed below the wheel arch 6c of the door outer panel 6. Each fixing hole 16a is fixed to the associated seal fixing hole 6g with fixtures such as bolts and clips (not shown) (see FIG. 1).

As a result, the seal member 13 is directly attached to the door body 5 via the fixing portion 16.

Figure 10:
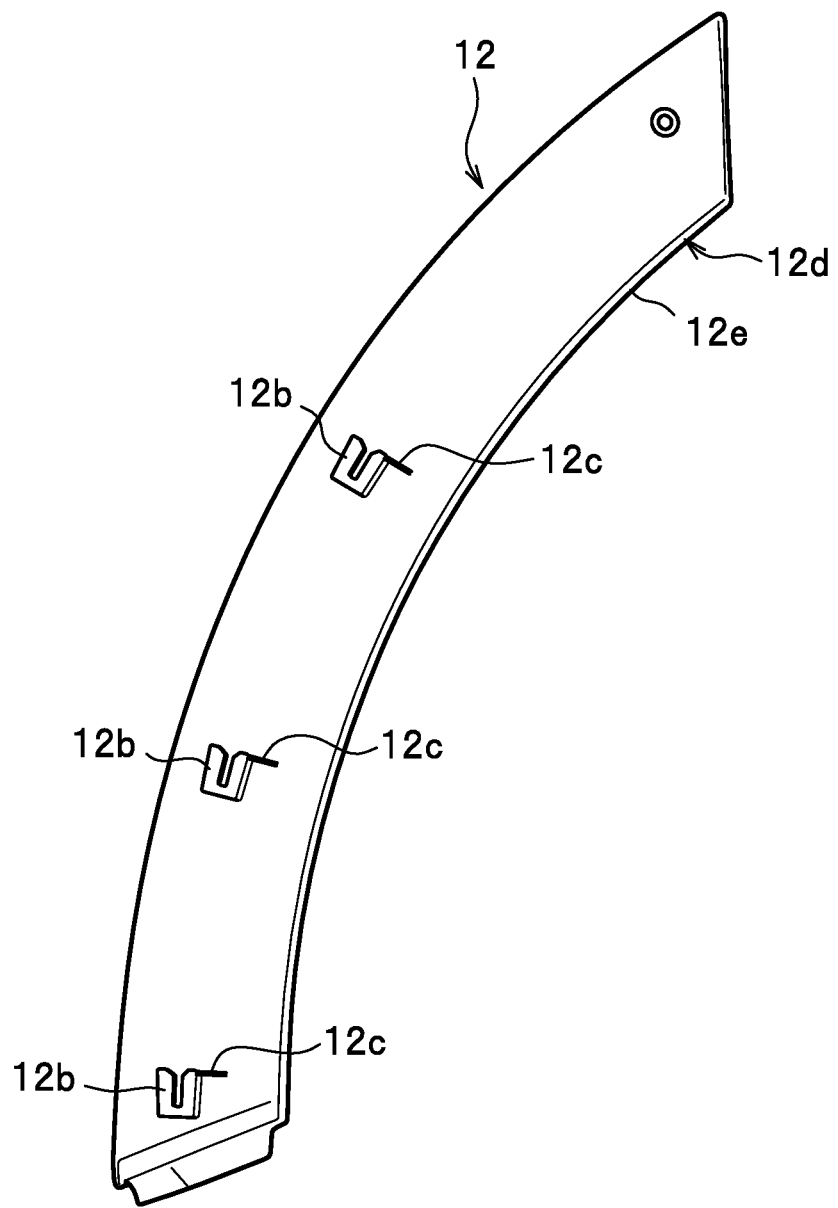
FIG. 10 is a rear view of a second garnish.

As shown in FIG. 1, the clamped portion 17 is clamped between the wheel arch 6c on the door outer panel 6 of the rear door 4 and the second garnish 12. As shown in FIG. 10, the second garnish 12 is formed in an arc shape to have a given width so as to conform to the shape of the wheel arch 6c.

Figure 11:
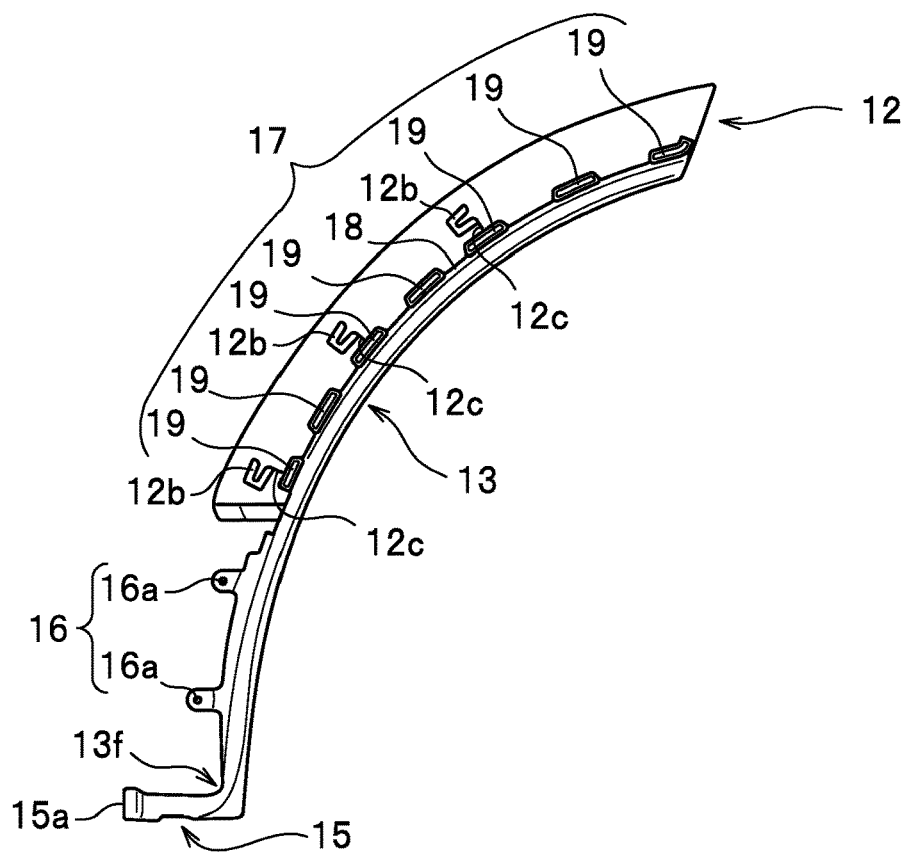
FIG. 11 is a rear view of the seal member attached to the second garnish.

As shown in FIG. 11, the clamped portion 17 has a body portion 18 that is fixed to the second garnish 12 and a plurality of protruding legs 19 that protrudes from the body portion 18 toward the rear door 4.

The body portion 18 continues from the base member 13 upward to have a substantially arc shape along the wheel arch 6c in a side view. Each protruding leg 19 is in an oval shape in a front view and has a peripheral wall 19a that has a given height h1 and a circular cross section at right angle to the lateral direction. An end edge 19b having a given peripheral length is formed on the upper edge of the peripheral wall 19a to contact the outer face of the wheel arch 6c (see FIGS. 13 and 14).

Slit-shaped locking portions 12b that locks the respective locked portions 6f shown in FIG. 1 are formed at given intervals on the rear side of the second garnish 12.

The second garnish 12 of the present embodiment is configured to, when attached to the wheel arch 6c, clamp the protruding legs 19 constituting the clamped portion 17 between the rear face of the second garnish 12 and the wheel arch 6c so as to fix the seal member 13.

Figure 14:
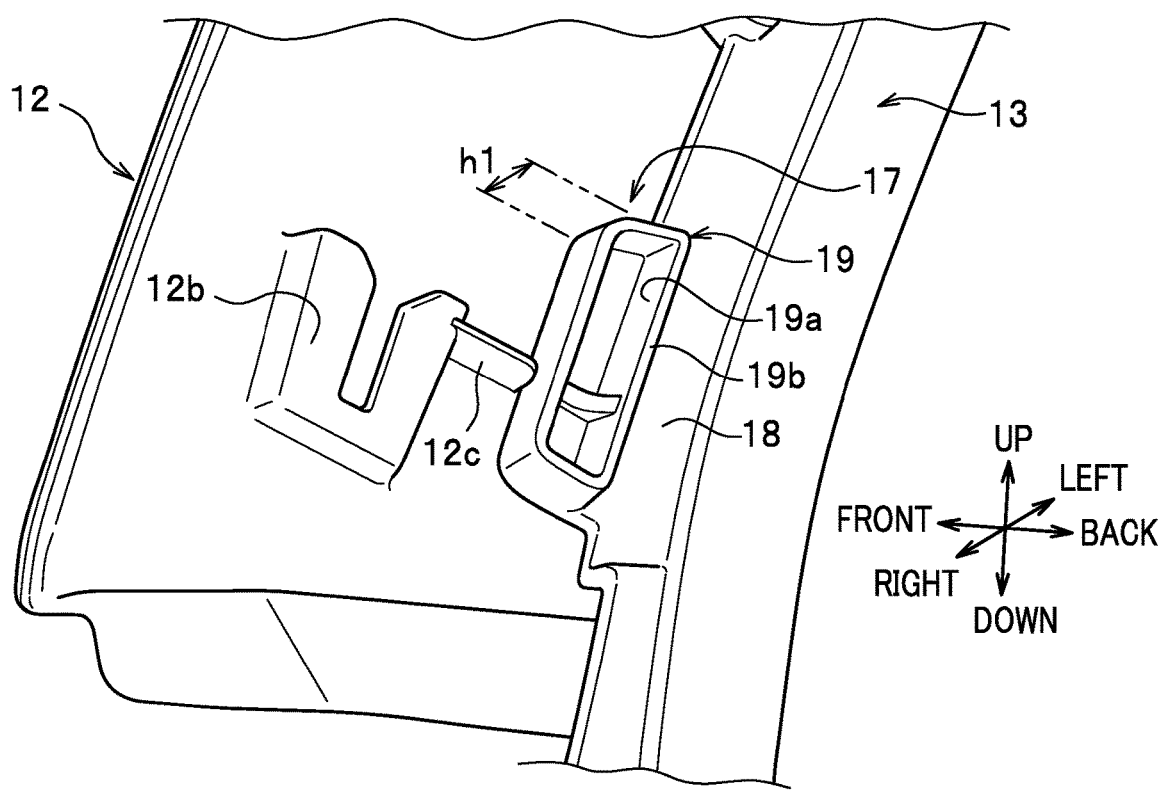
FIG. 14 is a perspective view of the protruding leg positioned on a rear face of the second garnish as viewed from a direction A in FIG. 13, without a door inner panel.

Further, as shown in FIG. 14, a plate wall-shaped positioning wall 12c is integrally extended from the locking portion 12b. The positioning wall 12c has an approximately even height and extends along the radial direction of the wheel arch 6c so that the top edge in the longitudinal direction contacts the side face of the protruding leg 19.

Figure 12:
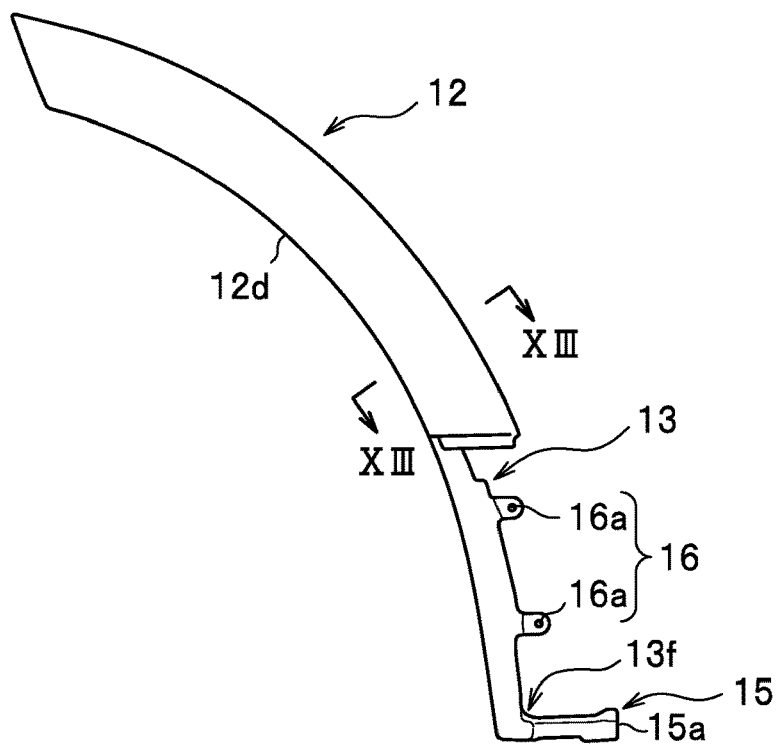
FIG. 12 is a front view of the seal member attached to the second garnish.
Figure 15:
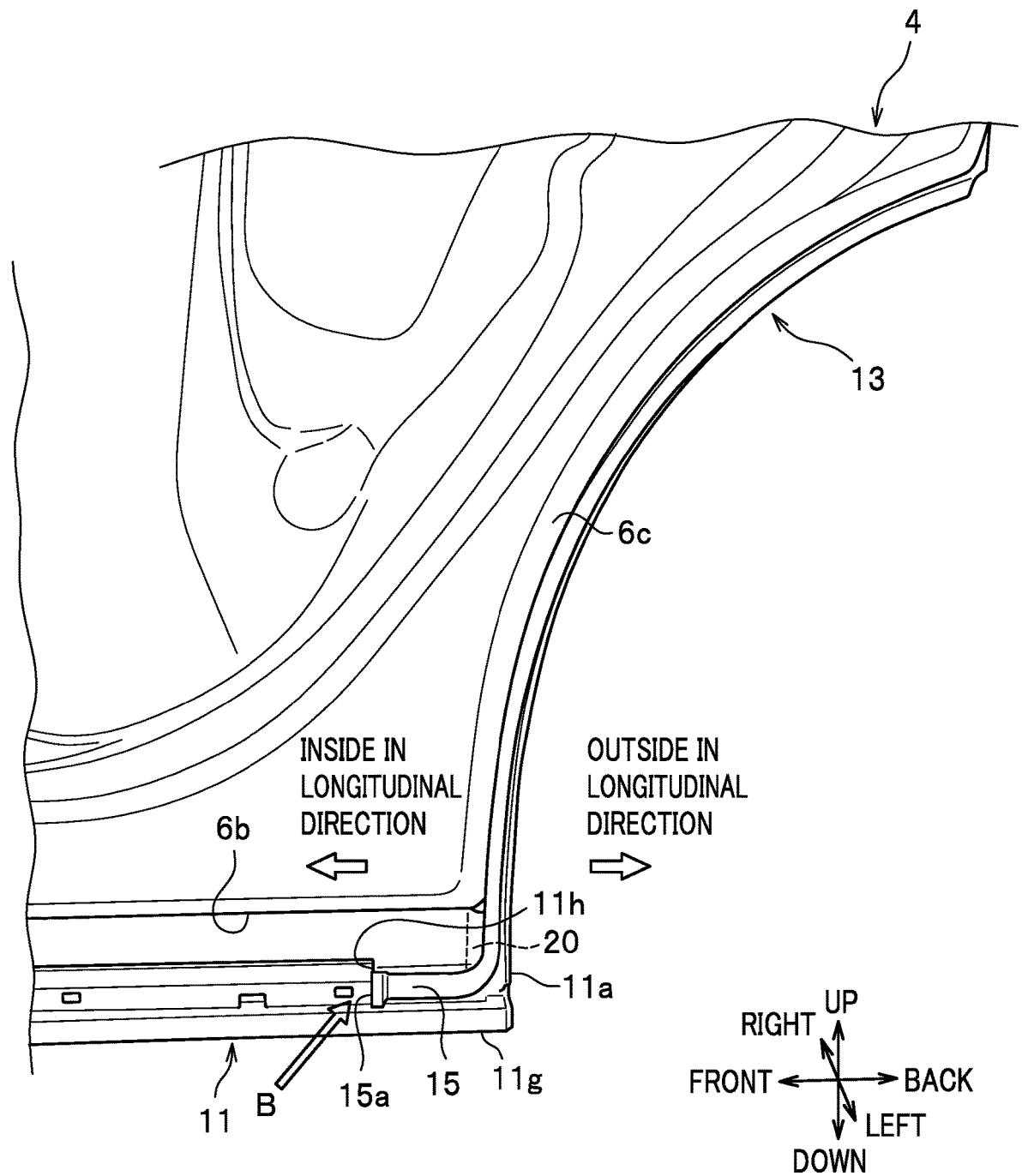
FIG. 15 is a rear view of the rear door attached with the seal member as viewed from inside the vehicle.

In a state where the seal member 13 together with the second garnish 12 is attached to the door outer panel 6, each positioning wall 12c is in contact with the side face of the protruding leg 19, so that the rear edge of the seal member 13 is aligned with a rear edge 12d of the second garnish 12 (See FIG. 12). FIG. 15 is a rear view of the wheel arch 6c of the rear door 4 attached with the seal member 13, as viewed from inside the vehicle. The seal member 13 is aligned with the inner edge of the wheel arch 6c. Therefore, the seal member 13 does not run out of the second garnish 12, to improve the appearance quality.

Still further, in a state where the second garnish 12 is attached to the wheel arch 6c, the protruding legs 19 are clamped to fix the body portion 18 on the second garnish 12. At this time, the protruding legs 19 are positioned on the rear face of the second garnish 12. Each annular end edge 19b is configured to contact the outer face of the wheel arch 6c with a substantially uniform pressing force.

Figure 16:
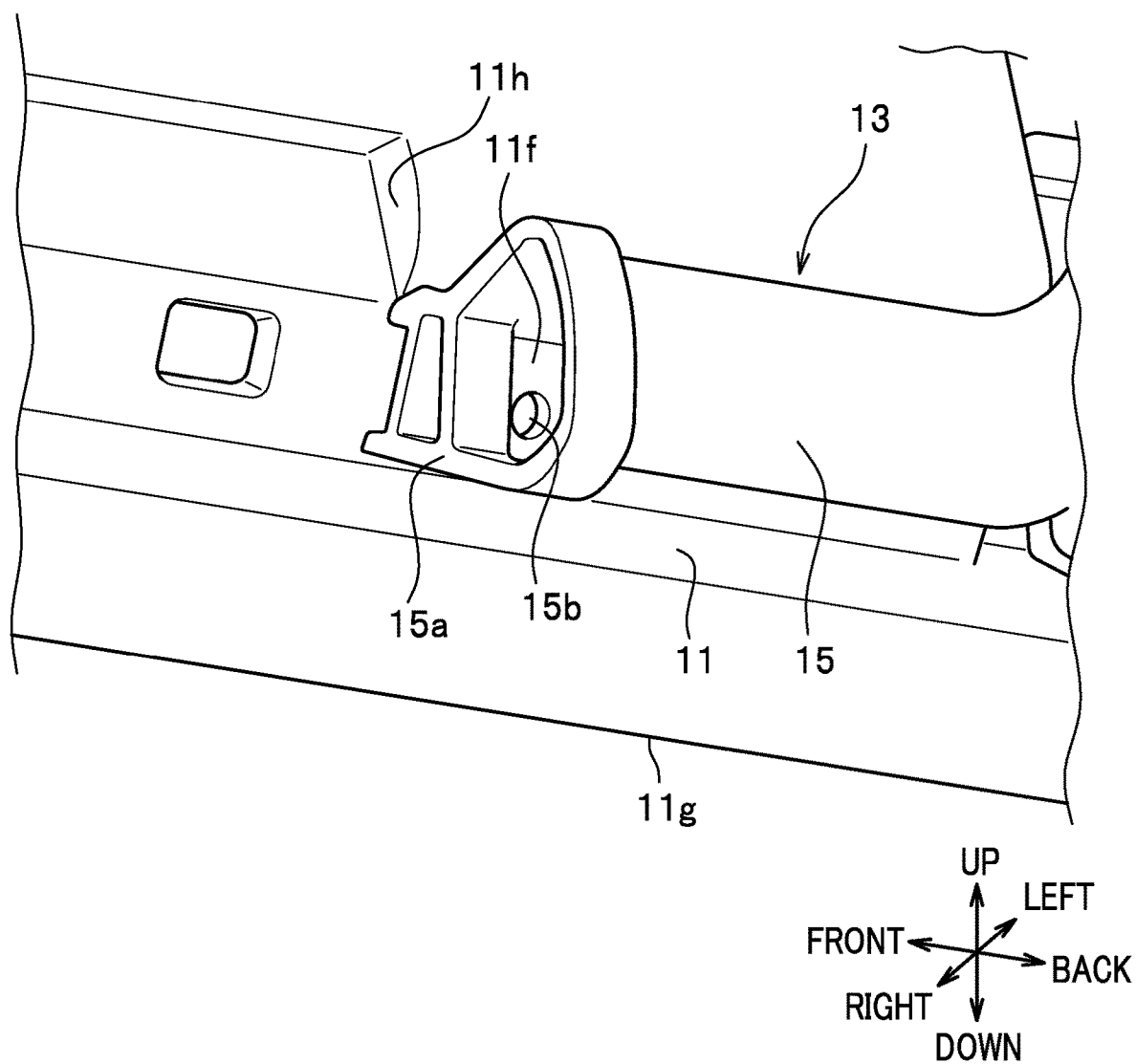
FIG. 16 is a perspective view of a distal face of the seal member as viewed from a direction B in FIG. 15.

FIG. 16 is a perspective view of a distal face 15a of the lower seal portion 15 as viewed from a direction B in FIG. 15.

The door body 5 does not extend to a position lower than the lower portion 6b of the door outer panel 6 on which the first garnish 11 is arranged. Therefore, the seal member 13 needs to be inserted into the insertion groove 20 of the first garnish 11 so as to be securely fixed.

The lower seal portion 15 is inserted from the rear end portion 11a of the first garnish 11 along the lower edge 11g (see FIG. 1). At this time, the engaged portion 13f of the base member 13a is inserted in the insertion groove 20 so as to be engaged without a clearance, as shown in FIG. 6.

The lower seal portion 15 is in a hollow cylindrical shape. The distal face 15a of the lower seal portion 15 is aligned with a stepped portion 11h of the first garnish 11 so as to meet together in the longitudinal direction.

Accordingly, an insertion length of the base member 13a in the insertion groove 20 is roughly obtained from the position of the distal face 15a.

Further, an attachment hole 15b is formed in the hollow inner face of the lower seal portion 15. As shown in FIG. 15, when the seal member 13 is attached along the lower edge 11g of the first garnish 11, the attachment hole 15b is aligned with an attachment hole 11f formed in the first garnish 11.

Therefore, the lower seal portion 15 is stably fixed to the door body 5 with a good positional accuracy as well as the wheel arch seal portion 14 fixed to the wheel arch 6c.

Note that aligning the distal face 15a and forming the attachment hole are simultaneously made at the time of die-molding. Therefore, the number of processing steps is not increased.

Next, advantageous effects of the vehicle body structure of the present embodiment will be described.

The engaged portion 13f is inserted in the insertion groove 20 defined by the contact wall 21 and the pressing wall 22 to attach the base member 13a of the seal member 13 to the first garnish 11. In this state, a compartment side face 13b contacts the inner face of the contact wall 21 (see FIG. 7).

In the state where the seal member 13 is attached, the compartment side face 13b of the base member 13a is in contact with the contact wall 21 having the inner face in a direction orthogonal to the opening and closing direction of the rear door. Therefore, a load in a peeling direction of the seal member 13 is securely received.

Accordingly, the seal member 13 is stably attached to the first garnish 11 without fixtures such as clips. Therefore, as compared with the structure using clips, the number of parts and the manufacturing cost are reduced.

In the present embodiment, the engaged portion 13f of the base member 13a is pressed toward the compartment by an expanded portion 22 having a dogleg cross-section of the pressing wall 22. Therefore, the engaged portion 13f of the seal member 13 is fixed so as to be clamped from both sides by the contact wall 21 and the pressing wall 22. Thus, the lower portion of the seal member 13 is stably attached to the rear door 4.

Figure 13:
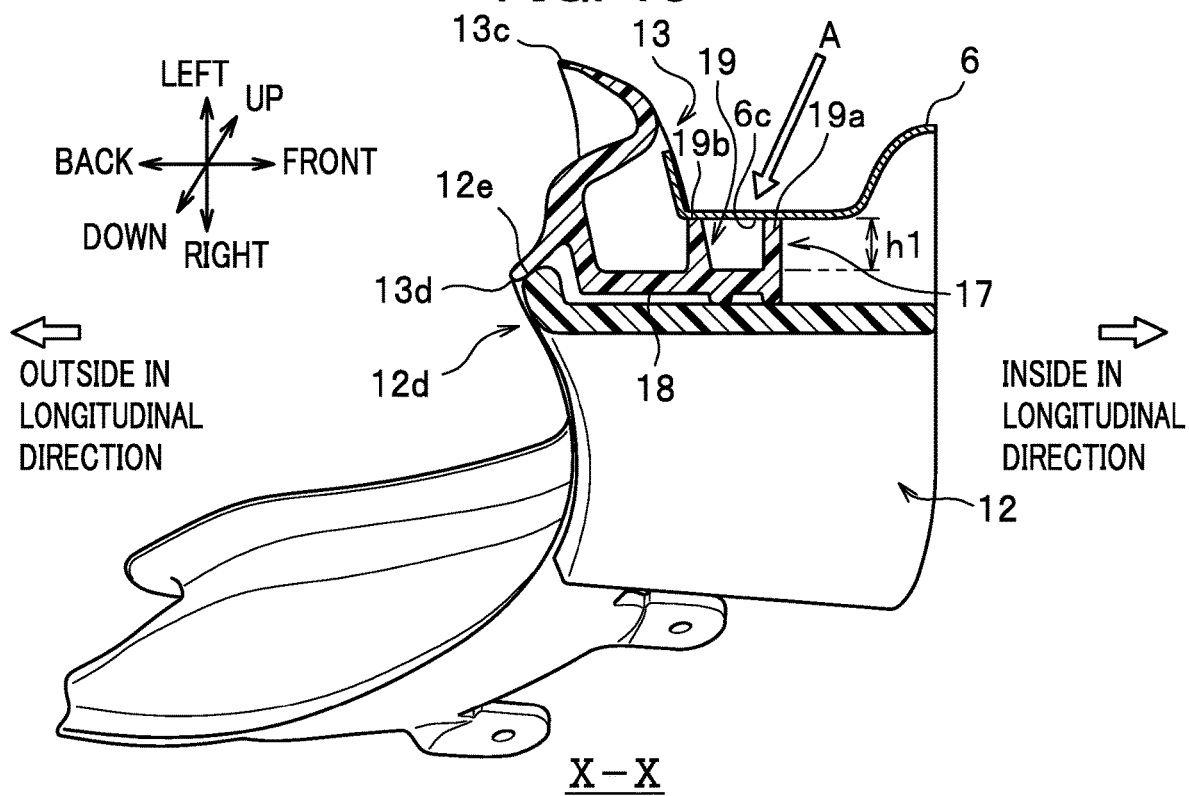
FIG. 13 is a cross-sectional view of the rear door taken along an X-X line in FIG. 2 showing that an annular protruding leg is in contact with a vehicle body panel.

The seal member 13 has the clamped portion 17 that is clamped by the wheel arch 6c of the rear door 4 and the second garnish 12 (see FIG. 13).

The clamped portion 17 is clamped by the wheel arch 6c arranged in the door outer panel 6 of the rear door 4 and the second garnish 12 so as to be stably attached.

The second garnish 12 is arranged at a position not to be overlapped with the first garnish 11 and to be overlapped with the rear door 4 as viewed from the lateral direction (see FIG. 2).

In this manner, even at a portion where the contact wall 21 of the first garnish 11 is not formed, the load in the peeling direction of the seal member 13 is securely received, to improve the sealability of the seal member 13 that seals a gap between the vehicle body 2 and the rear door 4.

In the present embodiment, as shown in FIG. 10, the second garnish 12 is formed in a curved shape along the arch shape of the rear wheel. On the rear face of the second garnish 12, the locking portions 12b are formed along its longitudinal direction. The positioning walls 12c are respectively formed so as to be adjacent to the locking portions 12b.

The locking portions 12b are locked with the locked portions 6f along the wheel arch 6c of the door outer panel 6. When the second garnish 12 is attached, as shown in FIG. 14, the positioning wall 12c contacts the protruding leg 19. Therefore, the second garnish 12 is accurately positioned and fixed to the door outer panel 6 along the shape of the wheel arch 6c.

Each end edge 19b of the peripheral wall 19a in an annular shape is contacted on the outer face of the wheel arch 6c, so that each protruding leg 19 arranged in the clamped portion 17 is clamped between the second garnish 12 and the door outer panel 6.

As shown in FIG. 14, since the protruding leg 19 includes the annular peripheral wall 19a, the protruding leg 19 easily attains the desired rigidity and securely receives the load in the peeling direction of the seal member 13. Therefore, sufficient rigidity is attained without forming the body portion 18 in a large size. Thus, forming the body portion 18 so as not to be too large allows for avoiding an increase in weight.

In the present embodiment, when the second garnish 12 clamps the seal member 13, the second garnish 12 contacts the end edges 19b of the protruding legs 19 almost evenly that are arranged so as to be positioned outer than the wheel arch 6c by the height h1 of the peripheral walls 19a.

Therefore, the load in the opening and closing direction of the rear door 4 is evenly and securely received by the wheel arch 6c and the second garnish 12. Thus, the deformation of the seal member 13 in the peeling direction is suppressed. Accordingly, there is no risk of causing the bending deformation or the like on the front face of the second garnish 12, to improve the quality in appearance.

As shown in FIG. 6, the distal edge 13e of the garnish seal portion 13d is arranged to contact the inclined portion 11e of the rear wall 11d so as to be overlapped therewith in the direction A as viewed from outside in the longitudinal direction. Accordingly, a gap between the inclined portion 11e and the distal edge 13e is filled to maintain the quality of appearance.

Even if the first garnish 11 expands or contracts in the longitudinal direction due to thermal deformation, the distal edge 13e is guided along the inclined portion 11e to move smoothly. Therefore, rapid deformation is sufficiently suppressed to avoid a situation such that the gap between the inclined portion 11e and the distal edge 13 is widened so as to be visible.

The distal edge 13e of the garnish seal portion 13d is positioned outer in the longitudinal direction than the inclined portion 11e of the rear wall 11d.

Therefore, the garnish seal portion 13d has an enough size to cover the inclined portion 11e. Therefore, even if the first garnish 11 expands or contracts in the longitudinal direction due to thermal deformation, there is no risk that the distal edge 13e is caught by the inclined portion 11e to be folded back. Accordingly, the distal edge 13e is maintained to further stably contact the inclined portion 11e.

Further, as with the inclined portion 11e of the rear wall 11d, an inclined portion 12e is formed in the rear side edge 12d of the second garnish 12 in the present embodiment (see FIG. 13). The seal member 13 is arranged such that the garnish seal portion 13d is in contact with the inclined portion 12e so as to be overlapped therewith, as viewed from outside in the longitudinal direction.

Accordingly, the garnish seal portion 13d is stably brought into contact with the inclined portion 12e.

Further, in the seal member 13, the lower seal portion 15 in a hollow cylindrical shape is integrally molded with the wheel arch seal portion 14. Therefore, an another step of joining the lower seal portion 15 to the wheel arch seal portion 14 is not necessary.

Further, in the present embodiment, since die-molding is executed simultaneously, molding precision is improved. Still further, since the number of parts does not increase, an increase in manufacturing cost is avoided.

Further, in a case where either one of the lower seal portion 15 and the wheel arch seal portion 14 is extrusion-molded, a difference in hardness may exist between the lower seal portion 15 and the wheel arch seal portion 14 to impair sealability.

In contrast, the seal member 13 of the present embodiment has the lower seal portion 15 and the wheel arch seal portion 14 simultaneously die-molded and has the lower seal portion 15 formed in a hollow cylindrical shape.

Accordingly, the difference in sealability based on the difference in hardness between the lower seal portion 15 and the wheel arch seal portion 14 is reduced by adjusting the elasticity of the lower seal portion 15.

As described above, in the vehicle body structure of the embodiment, the seal member 13 is inserted in the insertion groove 20 defined in the first garnish 11 to make the compartment side face 13b of the base member 13a contact the inner face, defining the insertion groove 20, of the contact wall 21. Therefore, even if a load is applied in the peeling direction of the seal member 13 when the rear door 4 is opened or closed, the load is securely received.

Accordingly, the vehicle body structure is provided that has fewer parts and allows the sealing member 13 securely sealing a gap between the vehicle body 2 and the rear door 4 to be attached thereto.

The present invention is not limited to the embodiment described above and may be modified variously. The above-described embodiment gives an example for describing the present invention so as to be easily understood, and is not necessarily limited to that having all the components described above. Further, a part of a structure in one embodiment may be replaced with a structure in another embodiment. Still further, the structure in the embodiment may be added with the structure of another embodiment. In addition, a part of a structure in each embodiment may be deleted, or added with or replaced with another structure. Possible modifications to the above embodiment are, for example, as follows.

In the vehicle body structure of the present embodiment, the rear door 4 arranged at the rear portion of the vehicle body 2 has been described as an example of a door. However, the present invention is not limited thereto and may be applied to, for example, a front door. That is, the shape, the quantity and the material are not particularly limited as long as a door covers and uncovers the door opening 3 formed in the vehicle body 2.

Further, the first garnish 11 and second garnish 12 are not limited to those shown in the present embodiment. For example, the first garnish 11 and second garnish 12 are not limited to be in a substantially rectangular shape in a front view, and may be in other shapes such as a trapezoid or triangle shape. Still further, the constituent material is not limited to a synthetic resin, and may be a carbon fiber material, a light metal such as aluminum, or a composite material thereof. That is, the shape, quantity and material of the first and second garnishes are not particularly limited.

What is claimed is:

1. A vehicle body structure comprising:
   a door that covers and uncovers a door opening formed in a vehicle body,
   wherein the door has a first garnish that is located on a vehicle outer side, and a seal member that is attached to the first garnish and seals a gap between the door and the vehicle body,
   wherein the first garnish has an insertion groove defined by a contact wall extending in a direction which is orthogonal to a lateral direction and a pressing wall which faces the contact wall and is outward from the contact wall in the lateral direction, and
   the seal member is inserted in the insertion groove and is pressed by the pressing wall so as to be in contact with the contact wall.

2. The vehicle body structure according to claim 1,
wherein the door has a second garnish at a position not to be overlapped with the first garnish and to be overlapped with the door has when viewed in the lateral direction, and the seal member has a clamped portion that is clamped by the door and the second garnish.

3. The vehicle body structure according to claim 2,
wherein the clamped portion has a body portion that is fixed to the second garnish and a protruding leg that protrudes from the body portion toward the door, and the protruding leg is in an annular shape in a cross section which is orthogonal to the lateral direction, and is in contact with the door.

4. The vehicle body structure according to claim 1,
wherein the first garnish is in an elongated shape and has an inclined portion having an inclined face facing an outside space of the vehicle body in the longitudinal direction of the first garnish, and the seal member is arranged to contact the inclined face so as to be overlapped therewith when viewed from outside in the longitudinal direction.

5. The vehicle body structure according to claim 4,
wherein the seal member extends outwardly over the inclined portion in the longitudinal direction, and a distal edge of the seal member is positioned apart outwardly from the inclined portion in the longitudinal direction.

6. The vehicle body structure according to claim 1,
wherein the seal member has a wheel arch seal portion to run along a wheel shape and a lower seal portion along a lower end shape of the door formed continuously in one piece.

* * * * *